(12) United States Patent
Fallas (10) Patent No.: US 8,997,438 B1
(45) Date of Patent: Apr. 7, 2015

(54) CASE PACKING SYSTEM HAVING ROBOTIC PICK AND PLACE MECHANISM AND DUAL DUMP BINS

(71) Applicant: David M. Fallas, Waco, TX (US)

(72) Inventor: David M. Fallas, Waco, TX (US)

(*) Notice: Subject to any disclaimer, the term of this patent is extended or adjusted under 35 U.S.C. 154(b) by 451 days.

(21) Appl. No.: 13/622,224

(22) Filed: Sep. 18, 2012

(51) Int. Cl.
*B65B 5/08* (2006.01)
*B65G 47/30* (2006.01)

(52) U.S. Cl.
CPC . *B65G 47/30* (2013.01); *B65B 5/08* (2013.01); *Y10S 901/07* (2013.01); *Y10S 901/17* (2013.01)

(58) Field of Classification Search
CPC .............. B65B 5/08; B25J 9/10; B25J 13/08; B65G 43/00; B65G 47/26; B65G 47/30; B65G 47/31
USPC ........... 53/249, 250, 251, 167, 468, 563, 564; 901/2, 7, 16, 17, 27; 414/222.07, 414/223.01, 733
See application file for complete search history.

(56) References Cited

U.S. PATENT DOCUMENTS

| | | | |
|---|---|---|---|
| 1,388,668 A | 8/1921 | Schumacher | |
| 1,766,573 A | 6/1930 | Westin | |
| 2,235,725 A | 3/1941 | Nordquist | |
| 2,443,952 A | 6/1948 | Gibert | |
| 2,597,069 A | 5/1952 | Conti | |
| 2,788,113 A | 4/1957 | De Waal | |
| 2,849,116 A | 8/1958 | Fried | |
| 2,905,310 A | 9/1959 | Stoeckel et al. | |
| 2,941,676 A | 6/1960 | Harker | |
| 2,948,417 A | 8/1960 | Haanes | |
| 2,956,384 A | 10/1960 | Underwood | |
| 3,022,620 A | 2/1962 | Gallet | |
| 3,224,549 A | 12/1965 | Cella et al. | |
| 3,319,767 A | 5/1967 | Breternitz et al. | |
| 3,389,906 A | 6/1968 | Walton | |
| 3,445,980 A | 5/1969 | Salomon | |

(Continued)

FOREIGN PATENT DOCUMENTS

| | | |
|---|---|---|
| CA | 2054074 C | 1/1996 |
| CA | 2117020 C | 9/2004 |

(Continued)

OTHER PUBLICATIONS

"Two-Axis Robot Suits Vertical Cartoning and Case Packaging," dated Sep. 20, 2002, obtained from http://news.thomasnet.com/fullstory/14316, generated May 8, 2009.

(Continued)

*Primary Examiner* — Scott A. Smith
(74) *Attorney, Agent, or Firm* — Wong, Cabello, Lutsch, Rutherford & Brucculeri LLP (57) ABSTRACT

A robotic case packing system loads articles from one conveyor into containers on another conveyor using a robotic pick and place mechanism and a set of pivoting bins. A controller moves the robotic mechanism in first picking movements to pick and place articles from the conveyor into the first bin. Once the first bin is full, the controller pivots the first bin to allow the articles stacked in the first bin to be loaded into a container held below. While the first bin is pivoting, the controller moves the robotic mechanism to pick and place articles from the conveyor into the second bin. The process repeats with the controller pivoting the second bin during the picking movements used to fill the first bin and vice versa.

22 Claims, 7 Drawing Sheets

(56) References Cited

U.S. PATENT DOCUMENTS

| | | | |
|---|---|---|---|
| 3,481,465 | A | 12/1969 | Way |
| 3,488,917 | A | 1/1970 | Oswald et al. |
| 3,512,336 | A | 5/1970 | Rosecrans |
| 3,575,276 | A | 4/1971 | Rupert |
| 3,590,972 | A | 7/1971 | Mosterd |
| 3,614,853 | A | 10/1971 | Seragnoii |
| 3,665,148 | A | 5/1972 | Yasenchak et al. |
| 3,673,756 | A | 7/1972 | Prete et al. |
| 3,673,759 | A | 7/1972 | Ayres et al. |
| 3,680,395 | A | 8/1972 | Douglas |
| 3,685,631 | A | 8/1972 | Harris |
| 3,729,085 | A | 4/1973 | Schlueter et al. |
| 3,736,997 | A | 6/1973 | Bottorf |
| 3,778,965 | A | 12/1973 | O'Lenick et al. |
| 3,783,584 | A | 1/1974 | Rauser |
| 3,783,587 | A | 1/1974 | Kurtenbach |
| 3,914,919 | A | 10/1975 | Boissy et al. |
| 3,955,665 | A | 5/1976 | Pettis |
| 3,974,888 | A | 8/1976 | Murakami et al. |
| 4,113,124 | A | 9/1978 | Muntjanoff |
| 4,135,346 | A | 1/1979 | Rebsamen |
| 4,135,616 | A | 1/1979 | Pellaton |
| 4,137,977 | A | 2/1979 | Alger |
| 4,344,493 | A | 8/1982 | Salmonsen |
| 4,356,906 | A | 11/1982 | Fallas |
| 4,398,383 | A | 8/1983 | Prakken |
| 4,407,107 | A | 10/1983 | Smith |
| 4,486,843 | A | 12/1984 | Spongh |
| 4,514,963 | A | 5/1985 | Bruno |
| 4,566,836 | A * | 1/1986 | Berger et al. ............... 414/791.6 |
| 4,660,352 | A | 4/1987 | Deines et al. |
| 4,764,077 | A | 8/1988 | Susnjara |
| 4,768,328 | A | 9/1988 | Mims |
| 4,781,011 | A | 11/1988 | Prakken |
| 4,846,336 | A | 7/1989 | Hoyland et al. |
| 4,864,801 | A | 9/1989 | Fallas |
| 4,867,299 | A | 9/1989 | Fukuoka et al. |
| 4,887,341 | A | 12/1989 | Sakimori et al. |
| 4,901,808 | A | 2/1990 | Wu |
| 4,951,445 | A * | 8/1990 | Thibault ..................... 53/167 |
| 4,976,582 | A | 12/1990 | Clavel |
| 4,991,708 | A | 2/1991 | Francioni |
| 5,088,569 | A | 2/1992 | Checcucci |
| 5,105,600 | A * | 4/1992 | DePoint et al. ............... 53/468 |
| 5,123,231 | A | 6/1992 | Fallas et al. |
| 5,172,800 | A | 12/1992 | Brown et al. |
| 5,186,306 | A | 2/1993 | Sjostrand |
| 5,197,584 | A | 3/1993 | Powell et al. |
| 5,239,807 | A | 8/1993 | Soleri |
| 5,244,100 | A | 9/1993 | Regier |
| 5,251,422 | A | 10/1993 | Goodman et al. |
| 5,279,099 | A | 1/1994 | Goodman et al. |
| 5,284,003 | A | 2/1994 | Goodman et al. |
| 5,286,160 | A | 2/1994 | Akeel et al. |
| 5,306,877 | A | 4/1994 | Tas |
| 5,308,930 | A | 5/1994 | Tokutu et al. |
| 5,326,218 | A | 7/1994 | Fallas |
| 5,369,222 | A | 11/1994 | Strelioff |
| 5,383,561 | A | 1/1995 | Tokutu |
| 5,415,267 | A | 5/1995 | Sato et al. |
| 5,487,257 | A | 1/1996 | Domeier et al. |
| 5,692,593 | A | 12/1997 | Ueno et al. |
| 5,720,156 | A * | 2/1998 | Bridges et al. ................. 53/438 |
| 5,727,365 | A * | 3/1998 | Lashyro et al. ................ 53/448 |
| 5,802,803 | A | 9/1998 | Kitagawa et al. |
| 5,966,900 | A | 10/1999 | Burford et al. |
| 5,996,308 | A | 12/1999 | Nakamura |
| 6,003,284 | A | 12/1999 | Goodman |
| 6,003,286 | A | 12/1999 | Goodman |
| 6,061,996 | A | 5/2000 | Vissers et al. |
| 6,252,181 | B1 | 6/2001 | Fallas |
| 6,540,063 | B1 | 4/2003 | Fallas |
| 6,655,901 | B2 | 12/2003 | Tsubota et al. |
| 6,701,694 | B2 | 3/2004 | Hüppi et al. |
| 6,860,088 | B2 | 3/2005 | Goodman |
| 6,874,615 | B2 | 4/2005 | Fallas |
| 7,644,558 | B1 | 1/2010 | Fallas |
| 7,900,578 | B2 * | 3/2011 | Hirose et al. ................. 118/500 |
| 8,387,349 | B2 * | 3/2013 | Bellante ........................ 53/564 |
| 8,894,343 | B2 * | 11/2014 | Yoshino ................... 414/222.07 |
| 2003/0014944 | A1 | 1/2003 | Bennett |

FOREIGN PATENT DOCUMENTS

| | | |
|---|---|---|
| EP | 0385245 | 9/1990 |
| GB | 1103496 | 2/1968 |
| GB | 1363548 | 8/1974 |
| GB | 1412679 | 11/1975 |
| GB | 2218679 A | 11/1989 |
| GB | 2227217 A | 7/1990 |
| GB | 2253826 A | 9/1992 |
| GB | 2275980 A | 9/1994 |
| JP | 55044489 | 3/1980 |
| JP | 2-218578 A | 8/1990 |

OTHER PUBLICATIONS

Oystar, "Oystar A + F: Twinline Twin Axis Robot," Product Brochure, undated, obtained from http://www.huettlin.com.

Oystar, "Jones Flexi-Pro," Product Brochure, undated, obtained from http://www.oystar-group.com/.

Oystar, "Oystar A + F: Packaging Machines," Product Brochure, date Sep. 2012, obtained from http://www.oystar-group.com/.

Brochure: Fallas "SLA Auto" Case Packer, copyright 1988.

McGraw-Hill Encyclopedia of Science & Technology, 7th Edition, 1992, vol. 10 pp. 98-99; vol. 15 pp. 516-522; vol. 9 pp. 537; vol. 10 pp. 572-576.

Brochure from Sabel Engineering Corporation on a case packer, copyright 1982.

FANUC Robotics America Inc.; Brochure for "Food-Grade Robots" (c)2006.

* cited by examiner

CASE PACKING SYSTEM HAVING ROBOTIC PICK AND PLACE MECHANISM AND DUAL DUMP BINS

BACKGROUND OF THE DISCLOSURE

1. Field of the Disclosure

The present disclosure relates to a case packing system and, more particularly, to a robotic case packing system for loading articles from a moving conveyor into containers, such as corrugated cardboard boxes.

2. Description of Related Art

For many years, attempts have been made to develop improved systems for picking up individual articles from a conveyor or similar conveyor system and depositing those articles within a container, such as a corrugated cardboard box. The desire is to accomplish this task with speed and accuracy. To meet the demand for speed, past solutions have used multiple robots along the conveyor, such as described in Applicant's U.S. Pat. No. 6,540,063, which is incorporated herein by reference. Often, if four such robot heads are used, each head picks up every fourth article on the conveyor system in a staggered manner so that the four robot heads effectively remove four consecutive articles during each iteration. While this multiplicity of heads increases the packing speed, the means for moving the robot heads from the conveyor system to the container may be awkward or cumbersome to implement.

To provide greater flexibility, multi-axis robots have been developed for picking an article off of a common conveyor. Many such multi-axis robots, however, have proven to be fairly slow and heavy. Hence, while such robots may provide greater flexibility in motion, they have also provided a need for an even greater number of robots to meet the speed requirements in the marketplace today. Additionally, it has been found that with some three-axis robots, the range of movement may be limited in certain directions. For example, certain three-axis robots are very limited in their vertical component, which can make movement of an article from a conveyor into a deep container difficult to perform.

To provide even greater flexibility, a multi-axis robot as disclosed in Applicant's U.S. Pat. No. 7,644,558, which is fully incorporated herein by reference, can be used for picking an article off of a common conveyor and placing the article in a container. The multi-axis robot can provide the desired speed of operation with the desired range of movement and can accurately pick articles from the conveying system and place them into containers.

Even with the improvements made so far in case packing, operators are continually striving for faster and more efficient systems for packing articles from a conveyor into containers.

SUMMARY OF THE DISCLOSURE

A robotic case packing system loads articles from a moving conveyor system into containers. A robotic pick and place mechanism is disposed above the articles conveyed on an article conveyor and is disposed in between first and second rotatable (i.e., pivoting or tiltable) bins situated next to the article conveyor. A controller operates the system and moves the pick and place mechanism in three axes in two sets of picking movements. In first picking movements, the mechanism picks and places the articles from the conveyor into the first bin while the first bin is in its set or upright position. Once the first bin is full, the controller rotates (i.e., pivots or tilts) the first bin from the set position, to a pivoted position, and then back to the set position. When pivoted, the bin allows the articles stacked in the first bin to slip into a container held below the first bin on a case conveyor. In this way, the stacked articles stand up in the open container, which can be later closed and sealed.

After completing the first picking movements, the mechanism picks and places the articles from the conveyor into the second bin in second picking movements. Once the second bin is full, the controller rotates (i.e., pivots or tilts) the second bin from the set position, to a pivoted position, and then back to the set position to fill another container on the case conveyor with the stacked articles. To speed up handling, the controller pivots the first bin during the second picking movements used to fill the second bin. Likewise, the controller pivots the second bin during the first picking movements used to fill the first bin.

The first and second bins can pivot about an axis parallel to or perpendicular to the conveyance direction of the conveyed articles, and each of the bins can have a flap or lid actuated to squeeze or compress the product to eliminate any slippage of the product while pivoting the bins to load the container. Once the bins are fully pivoted, then the flap or lid can be relaxed to allow the product to be loaded into the container. In this way, the articles can slip out an open side of the bin. The flap or lid can also squeeze or compress the articles in the bin, which can help the articles to better fit standing up in the container.

To coordinate handling, the controller can use sensors for sensing passage of the articles on the article conveyor and can control the speed of the article conveyor. Additionally, the controller can control the position of the containers on the case conveyor and can use actuatable stops and other mechanisms to properly position the containers below the bins.

The robotic mechanism can be a three-axis robot, such as a delta robot, having at least three actuators moving a handler in three perpendicular directions relative to the conveyance direction of the conveyed articles. Alternatively, the robotic mechanism can be a two-axis robot that can be pivoted about an axis so the mechanism can move a handler in three axes.

The foregoing summary is not intended to summarize each potential embodiment or every aspect of the present disclosure.

DETAILED DESCRIPTION OF THE DISCLOSURE

Figure 1A:
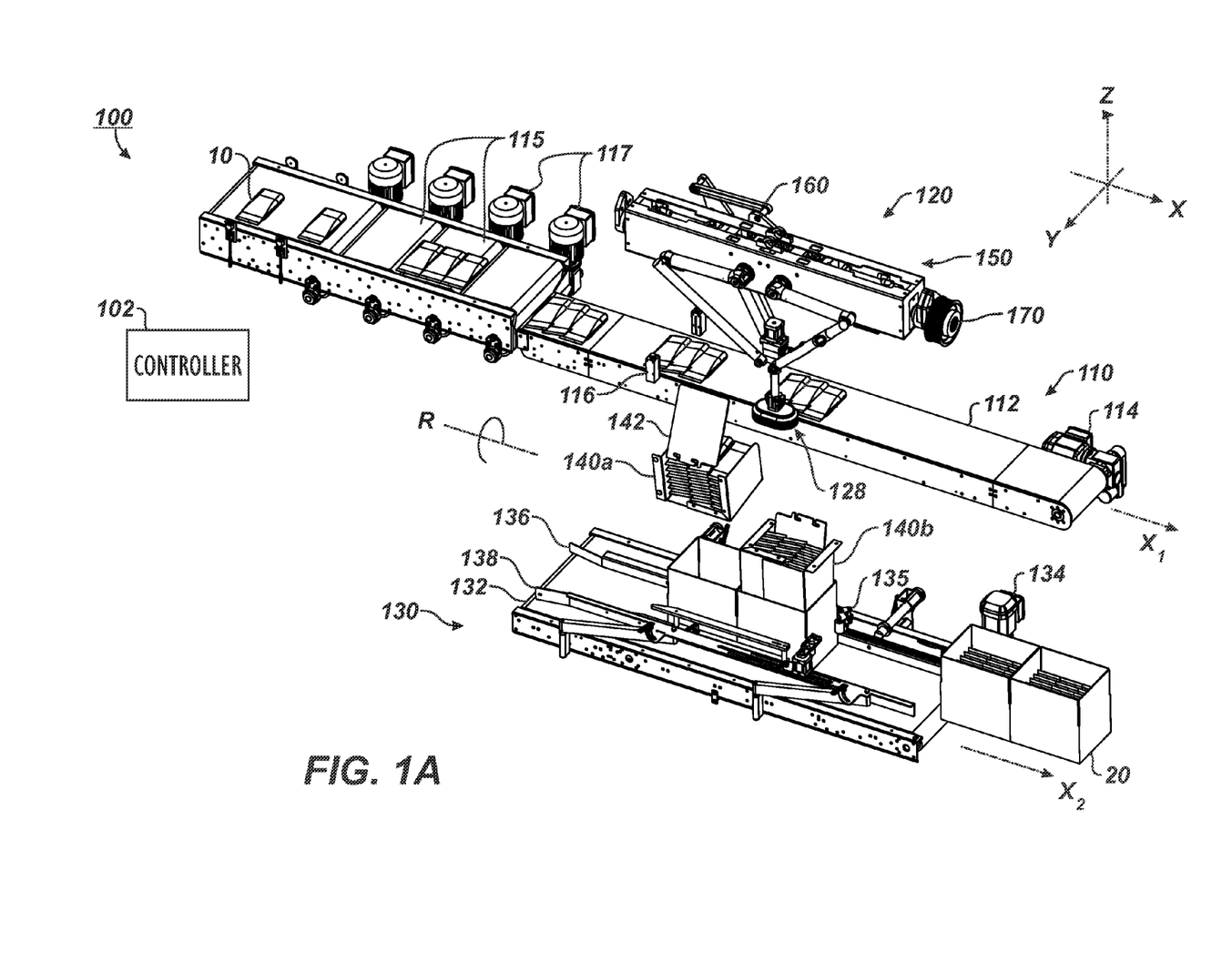
FIG. 1A is a perspective view of one embodiment of a robotic case packing system of the present disclosure having one type of robotic mechanism for picking and placing articles.
Figure 1B:
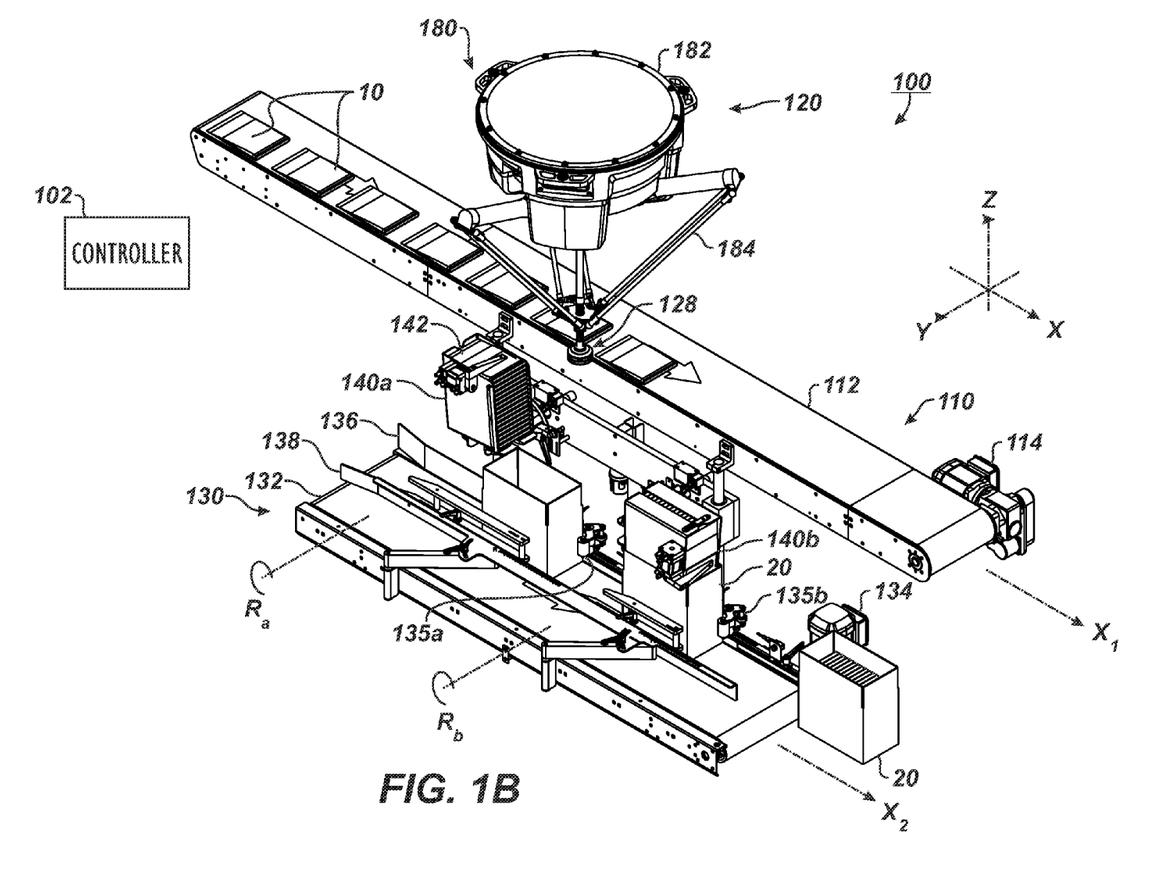
FIG. 1B is a perspective view of another embodiment of a robotic case packing system of the present disclosure having another type of robotic mechanism for picking and placing articles.

Referring to FIG. 1A-1B, a robotic case packing system 100 according to the present disclosure includes an article conveyor 110, a case conveyor 130, a control system 102 (shown schematically), and a pick and place mechanism 120. The robotic case packing system 100 uses the pick and place mechanism 120 to alternatingly pick articles 10 from the article conveyor 110 with a handler 128 and stack the picked article(s) 10 into one of two dump bins 140*a-b*. In turn, the system 100 rotates (i.e., pivots or tilts) the dump bins 140*a-b* to place the articles 10 into containers 20 (e.g., boxes) moved in position on the case conveyor 130 below. The articles 10 can be packages, bags, boxes, or any other type of item or product that can be loaded onto the article conveyor 110.

In FIG. 1A, the pick and place mechanism 120 uses a multi-axis robotic device 150 having a two-axis robot 160 and a pivot 170 to move the handler 128 in three axes (X, Y, Z) similar to the multi-axis robot disclosed in Applicant's incorporated U.S. Pat. No. 7,644,558. Particular details of this multi-axis robotic device 150 are provided later. In an alternative shown in FIG. 1B, the pick and place mechanism 120 uses a three-axis robotic device 180 having a head 182 and a number of arms 184 to move the handler 128 in three axes (X, Y, Z). A suitable type of three-axis robotic device is the ABB Flexpicker system or any comparable delta robot, such as described in U.S. Pat. No. 4,976,582. In any event, any suitable type of robotic mechanism can be used and can be actuated by pneumatics, electricity, hydraulics, or the like.

For its part, the handler 128 on the pick and place mechanism 120 can use a suction cup, a mechanical gripper, or other device to pick up and release the articles 10. For example, the handler 128 can be a vacuum pick assembly for selectively vacuuming and holding an article or articles 10 from the conveyor 110 and subsequently releasing the articles 10 when desired. It will be appreciated by those of skill in the art that other devices for handling the articles 10 may be used.

In both of the embodiments in FIGS. 1A-1B, the pick and place mechanism 120 is disposed above the article conveyor 130 with dump bins 140*a-b* positioned roughly on either side of the mechanism's vertical axis Z. For their part, the dump bins 140*a-b* are disposed next to the article conveyor 110 and positioned above the case conveyor 130. To speed up the packing, the system 100 operates in an alternating fashion with the two dump bins 140*a-b* as described below.

The controller 102 selectively actuates the pick and place mechanism 120 to move to the article conveyor 110 and pick up an article or articles 10, following which the pick and place mechanism 120 moves to one of the dump bins 140*a-b*. This is repeated as many times as need to fill the dump bin 140*a-b*, at which point the controller 102 pivots the dump bin 140*a-b* to deposit the articles 10 into a container 20 on the case conveyor 130. (Although not separately labeled, the dump bins 140*a-b* have necessary actuators and other components to pivot the bins 140*a-b*.)

As will be detailed below, the controller 102 preferably fills one of the dump bins (e.g., 140*a*) the pick and place mechanism 120 while the other full bin (e.g., 140*b*) is being pivoted and repeats this operation the other way around, filing the recently emptied bin (e.g., 140*b*) with pick and place mechanism 120 while dumping the just filled bin (e.g., 140*a*). Specific features of the controller 102 and how it communicates with the various motors, actuators, sensors, and the like in the system 100 are omitted, as they will be generally understood by one skilled in the art. In general, however, the controller 102 includes one or more processing unit and memory and uses software to operate the various functions of the system 100.

The controller 102 can use a combination of any number of commercially available software packages and sensing mechanisms available in the marketplace for use with a two-axis-robot and a servo motor. For example, in one embodiment, available automation software and controls can be used in conjunction with the robotics to actuate and control the motion of the pick and place mechanism 120 in response to input from stimuli, such as from a photo cell or other sensor 116.

During operation, the article conveyor 110 delivers articles 10 in a spaced manner (which spacing may be regular or random). Preferably, the delivery is at a known, constant speed, but this is not strictly necessary. To accurately monitor and control the known speed, the article conveyor 110 can use a geared belt similar to a timing belt with an encoder. Additionally, sensors (e.g., 116: FIG. 1B) can detect passage of the article(s) 10 to coordinate the movements of the pick and place mechanism 120. The sensor 116 can use any suitable imaging systems and can even determine the placement of articles 10 across the width of the conveyor 10 so the articles 10 do not need to be individually conveyed in a line.

In FIG. 1A, a set of combining conveyors 115 separately operated by motors 117 combine several articles 10 together on the article conveyor 110 so the wider handler 128 can grip the set of articles 10 together for placing in the bins 140*a-b*. As shown in FIG. 1B, the articles 10 on the conveyor 110 are individually spaced, picked, and placed. Other options for conveying the articles 10 can be used as will be appreciated.

The pick and pack mechanism 120 picks up articles 10 from the article conveyor 110 and stacks the articles 10 one on top of another in one of the dump bins 140*a-b* at a time. When full of stacked articles 10, a given dump bin 140*a-b* is pivoted 90-degrees so that the stacked articles 10 slip out the open side of the dump bin 140*a-b* and into a container 20 positioned below on the case conveyor 130. For example, the articles 10 are placed flat in the bins 140*a-b*, being stacked by the pick and place mechanism 120 from the article conveyor 10.

When the bin 140*a-b* is filled with stacked articles 10, a mechanized flap or lid 142 closes over the open end of the bin 140*a-b*, and the bin 140*a-b* is tilted 90-degrees to place an open side of the bin 140*a-b* over the open top of the container 20. The stacked articles 10 then slide out of the bin 140*a-b* and land in the container 20. Because the articles 10 may be flat and can be stacked flat on top of one another in the dump bins 140*a-b*, the articles 10 fill the container 20 standing up inside the containers 20. The flap 142 can also squeeze or compress the articles 10 in the bin 140*a-b*, which can help them to better fit standing up in the container 20.

With the bins 140*a-b* installed, the system 100 can fill containers 20 with stacked articles 10 standing up inside as noted above. This can be the preferred way to pack certain types of articles 10 in the containers 20. Other articles and products may preferably be laid and stacked flat inside the containers 20. Advantageously, the system 100 of FIGS. 1A-1B can convert readily to pick and place articles 10 flat in the containers 20 as opposed to standing in the containers 20 as depicted here. To do this conversion, the bins 140*a-b* and the associated mechanisms (e.g., motors, actuators, etc.) can be removed from the system 100. The pick and place mechanism 120 using its programming can then pick articles 10 from the conveyor 110 and place the articles 10 flat inside the containers 20 on the case conveyor 130. Adjusting the height of the case conveyor 130 can further facilitate this conversion.

A support frame (not shown) supports the pick and place mechanism 120 relative to the conveyors 110, 130 so the mechanism 120 can move the handler 128 along a desired path of operation to selectively pick the articles 10 from the article conveyor 110 and place the articles 10 in the bins 140*a-b* over the case conveyor 130. The support frame (not shown) can have any of a variety of shapes and configurations suitable for providing requisite stability and support for the pick and place mechanism 120. That is, the support frame may be a stand-alone frame that is operatively associated with the conveyors 110, 130 to properly align the pick and place mechanism 120 with the conveyors 110, 130. Alternatively, the support frame may be part of a framework attached to a building in which the case packing system 100 is housed and utilized.

The system 100 can use any of a number of readily available and suitable conveyor systems that deliver articles 10 and containers 20 at a desired rate for handling. For example, the article conveyor 110 positions below and slightly to one side of the pick and place mechanism 120 and can have a conveyor belt 112 moved by a motor 114. Similarly, the case conveyor 130 positions below and slightly to one side of the pick and place mechanism 120 and can have a conveyor belt 132 moved by a motor 134. As an alternative to the belt and motor systems, either one or the both of the conveyors 110 and 130 can have systems using actuatable rollers or other suitable type of conveyance mechanism.

As shown, the case conveyor 130 positions parallel to the article conveyor 110. The case conveyor 130 is further positioned to be a pre-selected distance from the article conveyor 110 and to be horizontally below the article conveyor 110 to accommodate movement by the pick and place mechanism 120 that is both over the article conveyor 110 and downward to the case conveyor 130.

The case conveyor 130 has an inside rail 136 that properly places the containers 20 under the bins 140*a-b* and has a biased rail 138 the pushes the containers 20 against the inside rail 136. The case conveyor 130 moves corrugated cardboard cases or similar containers 20 in a conveyance direction $X_2$ parallel to the conveyance direction $X_1$ of the article conveyor 110. (Although parallel and shown traveling in the same orientation, the directions $X_2$, $X_2$ may travel opposite to one another.) The case conveyor 130 moves the containers 20 to pre-selected spots to receive the articles 10 from the dump bins 140*a-b*. Actuated stops 135 on the case conveyor 130 stops the containers 20 at the locations below the dump bins 140*a-b*. The case conveyor 130 may also include a case erector (not shown) for constructing corrugated cardboard cases or similar containers and moving them to the desired position for receipt of articles.

The dump bins 140-*b* can rotate (i.e., pivot or tilt) in any suitable direction. For example, the bins 140*a-b* can pivot in the direction of the article conveyor 110 as shown in FIG. 1B. Alternatively, the bins 140*a-b* as shown in FIG. 1A can pivot toward or away from the article conveyor 110 to dump the articles 10.

In particular, the bins 140*a-b* in FIG. 1A pivot about an axis R parallel to the conveyed directions $X_1$, $X_2$ of the conveyors 110 and 130. The bins 140*a-b* are positioned next to one another and turn about the rotational axes R toward the article conveyor 110 from an upright position (e.g., 140*a*) to a pivoted position (e.g., 140*b*). Below on the case conveyor 130, actuatable stops 135 along the inside rail 136 stop the movement of both containers 20 at the same time along the conveyed direction $X_2$ on the conveyor 130 so they are properly positioned beneath the bin's 140*a-b* in their pivoted positions.

By contrast, the bins 140*a-b* in FIG. 1B pivot about axes $R_a$, $R_b$ perpendicular to the parallel conveyed directions $X_1$, $X_2$ of the conveyors 110 and 130. The bins 140*a-b* are distanced from one another and turn with the conveyed directions $X_1$, $X_2$ from an upright position (e.g., 140*a*) to a pivoted position (e.g., 140*b*) about the rotational axes $R_a$, $R_b$. Below on the case conveyor 130, separate actuatable stops 135*a-b* along the inside rail 136 stop the movement of the containers 20 along the conveyed direction $X_2$ on the conveyor 130 so they are properly positioned beneath the bin's 140*a-b* in their pivoted positions. Having the bins 140*a-b* side-by-side (FIG. 1A) or separated (FIG. 1B) can be more advantageous for the motion and programming involved for the particular type of robotic mechanism 120 used.

Figure 2:
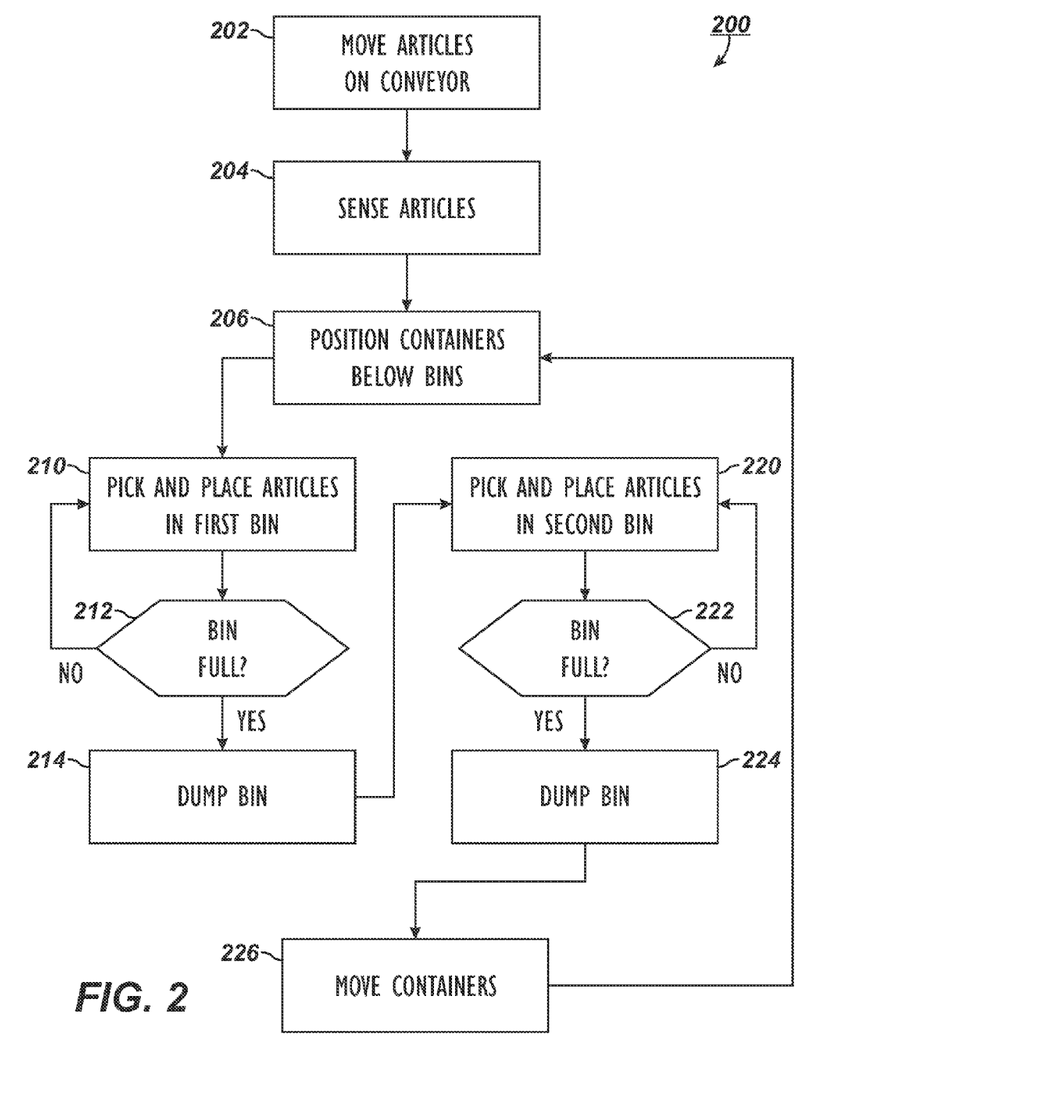
FIG. 2 is a flowchart showing operation of the disclosed system.

With an understanding of the case packing system 100, discussion now turns to a packing process 200 shown in FIG. 2. (Reference is made currently to FIGS. 3A-3C for better understanding). The controller 102 operates the article conveyor 110 moving the articles 10 next to the pick and place mechanism 150 (Block 202). (As described here, the pick and place mechanism 120 uses the multi-axis robotic device 150 having the two-axis robot 160 and pivot 170 of FIG. 1A, but the process 200 would apply equally as well to the embodiment having the three-axis robotic device 180 of FIG. 1B.) To coordinate the timing of the pick and place mechanism 120 and the feed of the articles 10 on the article conveyor 110, the controller 102 controls the speed of the conveyor 110 and the mechanism 120 based on sensing the movement of the articles 10 with the sensor 116, such as a photo cell or other imaging system (Block 204).

The controller 102 also controls the position of the containers 20 on the case conveyor 130, positioning the containers 20 below the dump bins 140*a-b*. Delivery of the containers 20 can be controlled by operating the conveyor 130 and one or more stops 135*a-b*. A sensor 117 can also be used as part of this process to position the containers 20. (For convenience, the containers 20 are depicted as separated, but could equally be held together depending on the bins' rotation.)

Figure 3A:
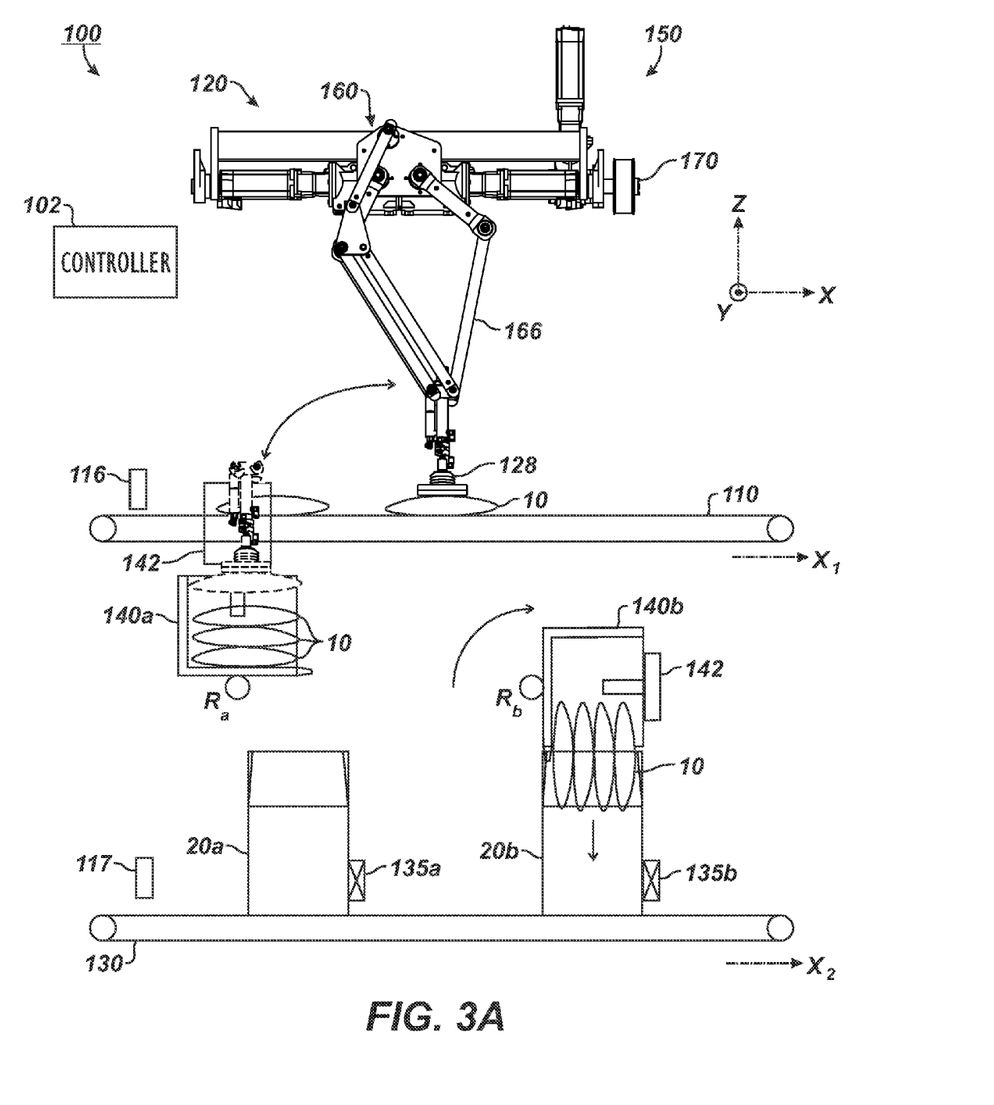
FIGS. 3A-3B are schematic side views of the disclosed system during stages of operation.
Figure 3B:
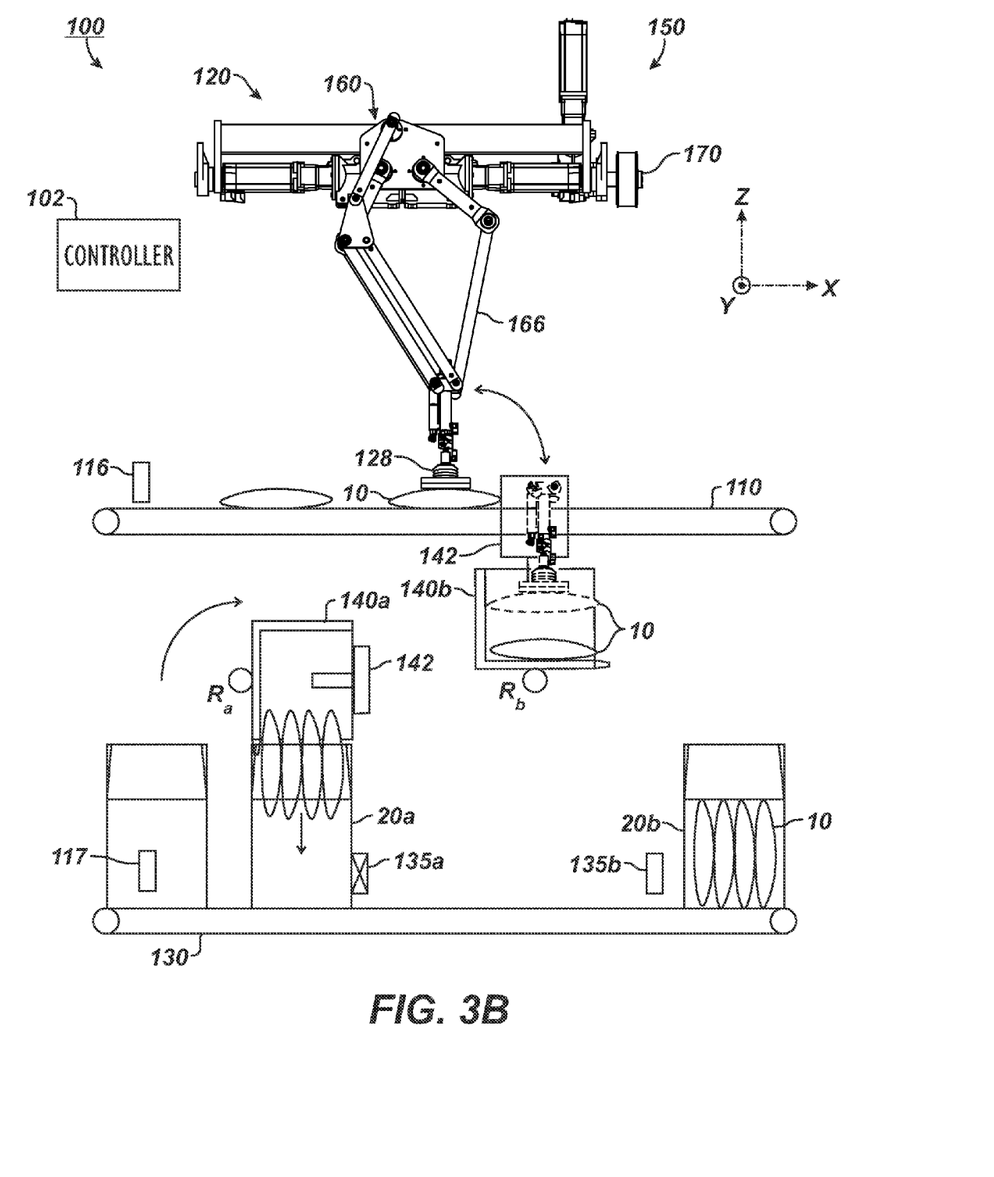
Figure 3C:
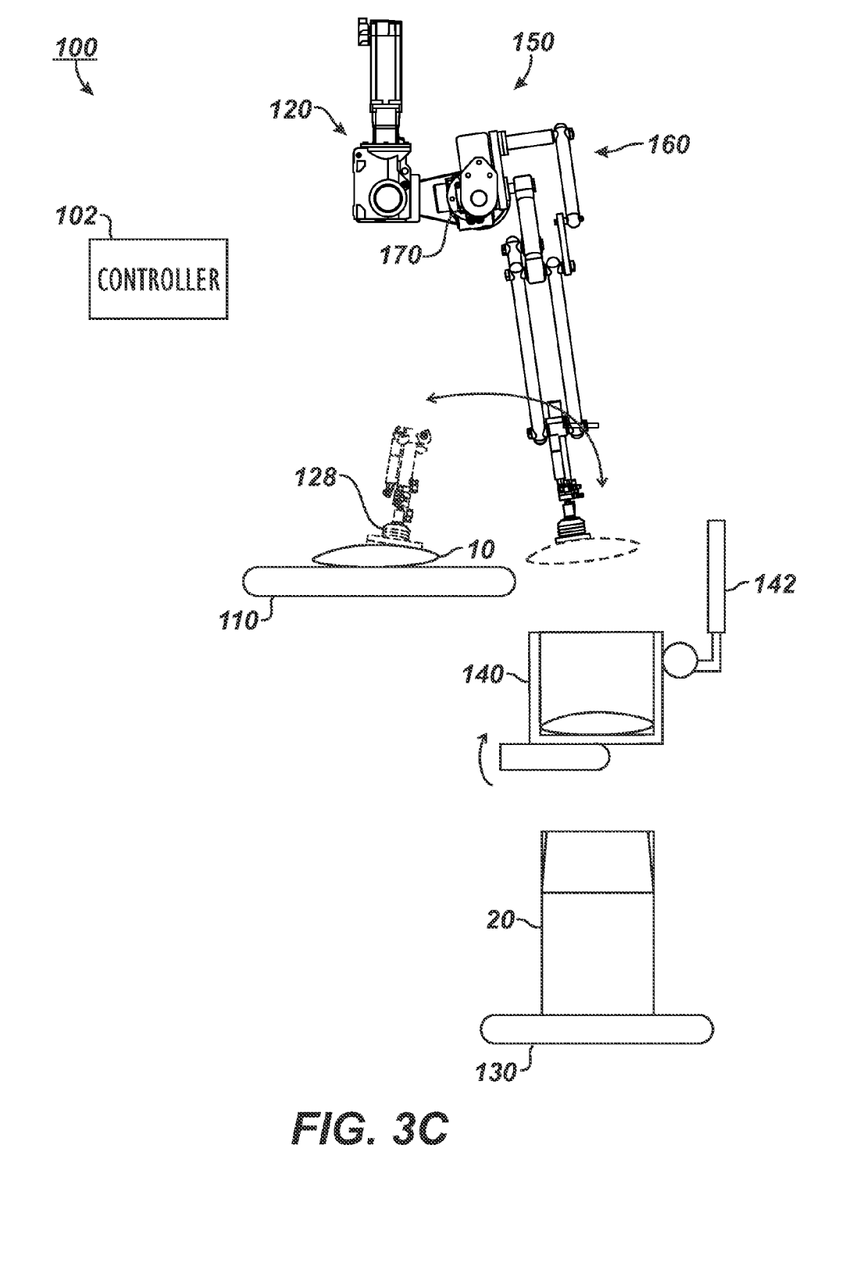
FIG. 3C is a schematic end view of the disclosed system during stages of operation.

As the controller 102 moves the articles 10 on the conveyor 110 and senses the articles 10, the controller 102 operates the pick and place mechanism 120 by first picking and placing the articles 10 from the article conveyor 110 into the first dump bin 140*a* (Block 210). FIG. 3A shows generic movement of the pick and place mechanism 120 during this first pick and place operation, and FIG. 3C shows the generic movement of the mechanism 120 to and from the conveyor 110. The movements are represented by the end positions, one end position at the conveyor 110 to pick an article 10 and one end position at the first bin 140*a* to place the article 10.

The picking and placing continues until the first bin 140*a* is full (Decision 212). When the bin 140*a* is full, the controller 102 actuates a holder 142 over the open top of the bin 140*a* and pivots the bin 140*a* so the stacked articles 10 fill the container 20*a* below on the case conveyor 130 (Block 214). (For convenience, rotation of the bins 140*a-b* is depicted about axes $R_a$, $R_b$ perpendicular to the conveyors 110, 130, but could equally be about the other axis of rotation parallel to the conveyors 110, 130.)

At this point as the controller 102 continues to move the articles 10 on the conveyor 110 and to sense the articles 10, the controller 102 operates the pick and place mechanism 120 by then picking and placing the articles 10 from the article conveyor 110 into the second dump bin 140*b* in a second pick and place operation (Block 220). FIG. 3B shows movement of the pick and place mechanism 120 in the end positions at the conveyor 110 and at the second bin 140*b*. The picking and placing continues until the second bin 140*b* is full (Decision 222). Then, the controller 102 dumps the second bin 140*a* so that the stacked articles 10 fill the container 20*b* below on the case conveyor 130 (Block 224).

With both of the containers 20*a-b* filled, the controller 102 operates the case conveyor 130 to move the containers 20*a-b* (Block 226) to be closed and sealed, for example. At this point, the controller 102 now positions empty containers 20a-b on the case conveyor 130 below the dump bins 140a-b and the process 200 continues as before.

As can be seen in the above process 200, the pick and place mechanism 120 can fill one dump bin 140a-b at one time and can subsequently switch to fill the other dump bin 140b. In other embodiments, the pick and place mechanism 120 can alternatingly pick and place articles in both of the bins 140a-b at the same time. However, the sequential operation of filling one bin 140a and then the other 140b is preferred because the full dump bin 140a-b can be pivoted to empty articles 10 into one of the containers 20 while the other bin 140a-b is being filled by the pick and place mechanism 120. In this way, the pick and place mechanism 120 does not have down time when it has to wait for dumping of the bins 140a-b in unison.

Still, the system 100 can use a combination of alternating and sequential filling of the bins 140a-b. As such, filling of the bins 140a-b can first be alternated. Then, when the first of the bins 140a-b is filled, sequential filling of the other, unfilled bin 140a-b can be performed while the full bin 140a-b is pivoted. The programming of the system 100 can be based on the number of articles 10 needed to fill the bins 140a-b, how fast the bins 140a-b can dump stacked articles 10, and whether the robotics of the pick and place mechanism 120 benefits from repeating sequentially movements or making alternating movements.

Figure 4A:
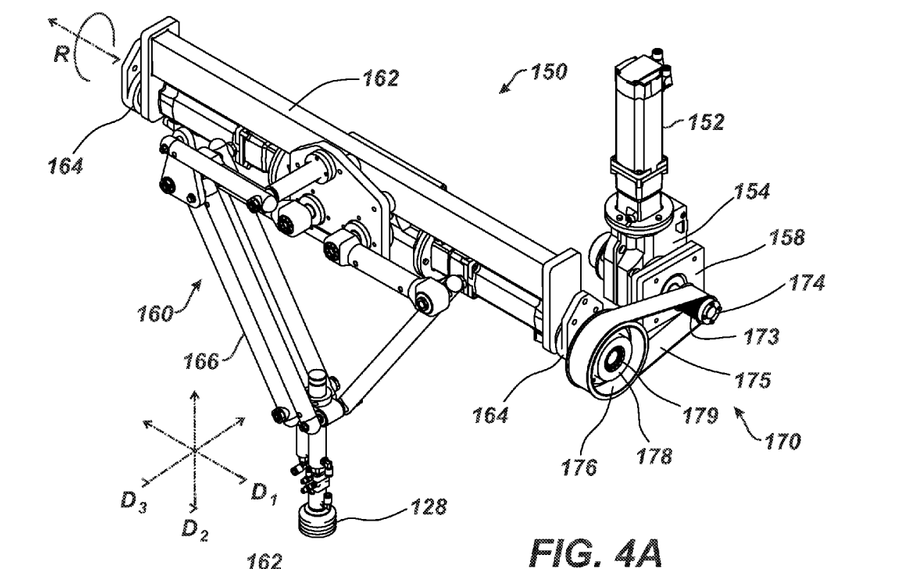
FIG. 4A is an isometric view of one particular embodiment of a pick and place mechanism for the robotic case packing system of the present disclosure.
Figure 4B:
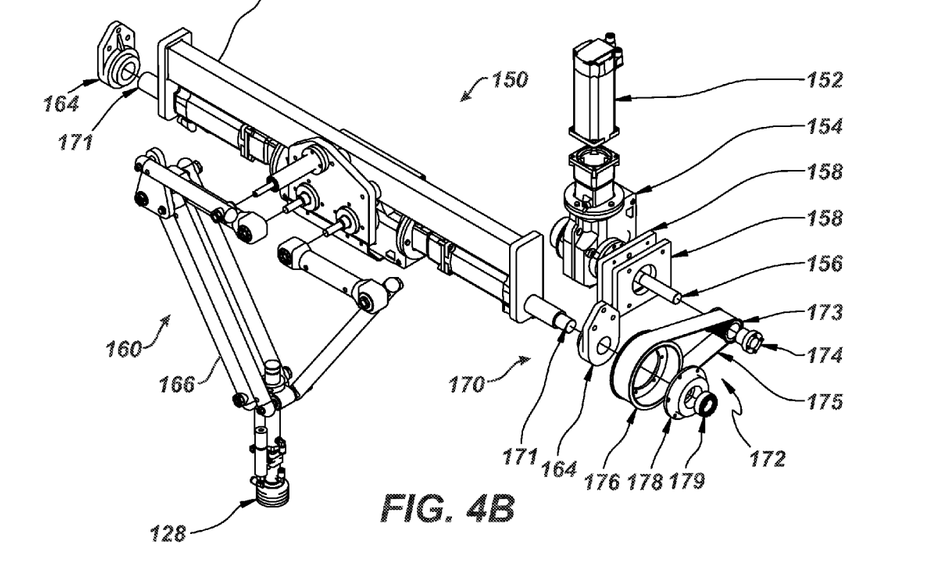
FIG. 4B is an exploded isometric view of the pick and place mechanism of FIG. 4B.

FIGS. 4A-4B shows a multi-axis robotic device 150 similar to that disclosed in incorporated U.S. Pat. No. 7,644,558 for use in the pick and place mechanism 120 in the disclosed system. As noted above, the multi-axis robotic device 150 includes a two-axis robot 160 and a pivot 170. The two-axis robot 160 has a body 162, linkage arms 166, and a handler 128. The two-axis robot 160 can move the handler 128 in a first direction $D_1$ parallel to a conveyance direction ($X_1$) of the conveyed articles and in a second direction $D_2$ toward and away from the body 162. The range of motion provided by the two-axis robot 160 in the second direction $D_2$ may be particularly useful in placing articles (10) in a bin 140a-b, which can be relatively deep in some implementations.

The pivot 170 supports the body 162 and rotates the two axis robot 160 about an axis of rotation R parallel to the first direction $D_1$. Thus, the robot's second direction $D_2$ of movement rotates about the axis of rotation R. When a motor 152 rotates the robot 160 about the pivot 170 about the axis of rotation R, the handler 128 can be moved in a third direction $D_3$ perpendicular to the first and second directions $D_1$ and $D_2$.

Looking in more detail, the multi-axis robotic device 150 includes a servo motor 152 connected to a gear box 154, which in turn connects to a gear box shaft 156. The servo motor 152 and gear box 154 connect to a fixed frame (not shown) using flanges 158 or similar supporting structure for securing the gear box 154 and motor 152 to the fixed frame. The body 162 of the robot 160 includes a pivot weldment 162 supported on a pivot drive shaft 171 for rotational movement in relation to the pivot weldment 162. The pivot weldment 162 and pivot drive shaft 171 are mounted to the fixed frame (not shown) by means of bearings 164, which are disposed at each end of the pivot drive shaft 171 and operatively connected to the pivot weldment 162 and the pivot drive shaft 171 such that the housings for the bearings 164 are secured in a stationary manner to the frame, while the pivot drive shaft 171 and the pivot weldment 162 are permitted to pivot or rotate about the axis of rotation R defined by the pivot drive shaft 171.

The linkage 166 and other components of the two-axis robot 160 are mounted on the pivot drive shaft 171 along the axis of rotation R such that movement of the two-axis robot 160 along its two directions $D_1$ and $D_2$ of movement occurs within planes substantially parallel to the axis of rotation R of the pivot drive shaft 171. The handler 128 is attached to the linkages 166 of the two-axis robot 160 for attaching to and gripping an article (10) from the article conveyor (110). As one example, the handler 128 can be a vacuum pick head suitable for securing the anticipated article for which the case packing system 100 is designed.

The multi-axis robotic device 150 further includes a drive linkage 172 (FIG. 4B) operatively connected between the servo motor 152 and the pivot drive shaft 171 to selectively rotate the pivot drive shaft 171 when desired. The drive linkage 172 can use any of a number of suitable drive mechanisms adapted for use between drive shafts such as the gear box drive shaft 156 and the pivot drive shaft 171 to translate the rotation of the gear box drive shaft 156 into desired rotation of the pivot drive shaft 171.

As shown, for example, the drive linkage 172 has a first pulley 173 connected to the gear box drive shaft 156 by a suitable bushing 174. The drive linkage 172 also includes a second pulley 176 suitably connected to the pivot drive shaft 171 by an appropriate hub 178 and locking assembly 179 as shown in FIG. 4B in exploded detail. As will be appreciated by those of skill in the art, the diameters of the pulleys 173 and 176 are each selected to provide the corresponding translation of rotation of the gear box pulley 173 and to rotation of the pivot drive shaft pulley 176. In turn, a drive belt 175 is disposed over the pulleys 173 and 176 to provide the requisite translation of rotation between the pulleys 173 and 176.

During operation of the robotic case packing system (100) with this robotic device 150 of FIGS. 4A-4B, articles (10) are advanced along the article conveyor (110) where they are sensed by a photo cell or other optical sensor (116: FIG. 1B) operatively associated with the controller (102). The controller (102) then actuates the servo motor 152 to pivot the two-axis robot 160 about the pivot drive shaft 171 around the axis of rotation R so that the handler 128 is aligned over the article conveyor (110). The controller (102) also actuates the two-axis robot 160 to cause downward movement of the handler 128 to engage an article (10). The two-axis robot 160 is then pivoted outwardly around the axis of rotation R defined by the pivot drive shaft 171. At the same time, the two-axis robot 160 is shifted to either the front or back positions relative to the front or back dump bins 140a-b.

When rotated about the axis and shifted, the handler 128 holding an article (10) swings over one of the dump bins (i.e., the front bin 140a). Containers 20 on the case conveyor 110 are advanced toward the front of the dump bins. At the same time, the two-axis robot 160 is actuated to lower the article 10 both downwardly into the bin 140a-b to selectively deposit the article 10 in the bin 140a-b. After depositing the article 10, the two-axis-robot 160 is then lifted and rotated and shifted back to engage another article 10 on the article conveyor 110.

The speed of a two-axis-robot 160 provides planer movement of the article handler 128 to engage, pick, and place an article 10. At the same time, the third degree of motion is provided by oscillating or pivoting the two-axis robot 160 back-and-forth a selected distance about the axis of rotation R.

In the embodiments of FIGS. 1A-1B, 2, and 3A-3C, one pick and place mechanism 120 is shown. In alternative embodiments for handling greater article quantities at greater speed, two or more pick and place mechanisms 120 may be positioned and aligned along the article conveyor 110 to increase the quantity of articles 10 that may be handled off the conveyor 110. In this alternative (not shown), if two pick and place mechanisms 120 are utilized, then the first mechanism may, for example, pick up the first, third, fifth, etc. article 10 on the article conveyor 110; and the second pick and place mechanism may pick up the second, fourth, sixth, etc. article 10 on the article convey 110. The number of articles 10 that each mechanism picks up before passing on an article 10 will depend on the article rate, and has substantial flexibility.

Generally, it may be advantageous (especially if the articles 10 are randomly spaced) to have each mechanism 120 in the line pick up as many articles 10 in a row as it is able to pick before passing on an article 10. The use of two or more pick and place mechanisms 120 aligned along the article conveyor 110 thereby enables the handling of a multiple number of articles 10 in the same amount of time. Additionally, the number of articles 10 that may be loaded into each container 20 is not affected by the number of pick and place mechanisms 120 as sometimes the case with prior devices. It will be appreciated by those of skill in the art in light of the present disclosure that yet additional pick and place mechanisms 120 may be aligned along the conveyor in accordance with the present invention in order to increase the speed of handling. Through the use of additional mechanisms 120, the only limitation on the number of articles that may be handled is the speed of the conveyor 110.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A case packing system for loading articles into containers, the articles conveyed next to the containers, the system comprising:
    first and second bins disposed next to the conveyed articles, each of the first and second bins selectively rotatable between set and rotated positions;
    a robotic mechanism disposed above the conveyed articles and disposed in between the first and second bins, the robotic mechanism movable in three axes; and
    a controller operatively coupled to the first and second bins and the robotic mechanism, the controller configured to:
        pick and place, in one or more first picking movements, one or more of the conveyed articles into the first bin in the set position,
        pick and place, in one or more second picking movements, one or more of the conveyed articles into the second bin in the set position,
        rotate the first bin from the set position, to the rotated position, and back to the set position after the one or more first picking movements, and
        rotate the second bin from the set position, to the rotated position, and back to the set position after the one or more second picking movements.

2. The system of claim 1, further comprising a first conveyor disposed next to the first and second bins and disposed below the robotic mechanism, the first conveyor conveying the articles relative to the first and second bins and the robotic mechanism.

3. The system of claim 2, wherein the controller is operatively coupled to the first conveyor and controls a speed of the first conveyor.

4. The system of claim 1, wherein the controller comprises a sensor sensing passage of the conveyed articles and coordinating the first and second picking movements of the robotic mechanism based on the sensed passage.

5. The system of claim 1, further comprising a second conveyor disposed beneath the first and second bins and conveying the containers relative to the first and second bins.

6. The system of claim 5, wherein the controller is operatively coupled to the second conveyor and controls position of the containers below the first and second bins.

7. The system of claim 6, wherein the second conveyor comprises at least one stop, the controller engaging and disengaging the containers with the at least one stop relative to the first and second bins.

8. The system of claim 1, wherein the controller is configured to:
    rotate the first bin from the set position, to the rotated position, and back to the set position during the one or more second picking movements, and
    rotate the second bin from the set position, to the rotated position, and back to the set position during the one or more first picking movements.

9. The system of claim 1, wherein the robotic mechanism comprises a three-axis robot moving a handler in three perpendicular directions relative to a conveyance direction of the conveyed articles.

10. The system of claim 1, wherein the robotic mechanism comprises:
    a two-axis robot having a base point and a handler, the two-axis robot moving the handler in a first direction parallel to a conveyance direction of the conveyed articles and moving the handler in a second direction toward and away from the base point;
    a pivot supporting the base point and rotatable about an axis of rotation parallel to the first direction;
    a motor rotating the two-axis robot on the pivot about the axis of rotation and moving the handler in a third direction perpendicular to the first and second directions.

11. The system of claim 1, wherein the controller stacks a plurality of the articles in the first and second bins such that the stacked articles stand in the containers when the first and second bins rotate relative to the containers.

12. The system of claim 1, wherein the first and second bins rotate about an axis parallel to a conveyance direction of the conveyed articles.

13. The system of claim 1, wherein the first and second bins rotate about an axis perpendicular to a conveyance direction of the conveyed articles.

14. The system of claim 1, wherein each of the first and second bins comprises a flap actuated to cover an open top of the bin when rotated from the set position to the rotated position.

15. A case packing method for loading articles into containers, comprising:
    conveying the articles along a first conveyance direction;
    conveying the containers along a second conveyance direction parallel to the first conveyance direction;
    picking and placing, in one or more first picking movements, one or more of the articles from the first conveyance direction into a first bin;
    picking and placing, in one or more second picking movements, one or more of the articles from the first conveyance direction into a second bin;

emptying the articles from the first bin into one of the containers after the one or more first picking movements; and emptying the articles from the second bin into another one of the containers after the one or more second picking movements.

16. The method of claim 15, further comprising controlling delivery of the articles by controlling a speed of the first conveyance direction.

17. The method of claim 15, further comprising controlling position of the containers below the first and second bins.

18. The method of claim 17, wherein controlling position of the containers below the first and second bins comprises selectively engaging and disengaging the containers in the second conveyance direction relative to the first and second bins.

19. The method of claim 15,
wherein emptying the articles from the first bin into one of the containers after the one or more first picking movements comprises rotating the first bin during the one or more second picking movements; and
wherein emptying the articles from the second bin into another of the containers after the one or more second picking movements comprises rotating the second bin during the one or more first picking movements.

20. The method of claim 15, wherein picking and placing the one or more articles comprises stacking a plurality of the articles in the first and second bins; and wherein emptying the articles from the first and second bins into the containers comprises standing the stacked articles in the container.

21. The method of claim 15, wherein picking and placing the one or more articles comprises moving a handler in three perpendicular directions relative to the first conveyance direction by operating a three-axis robot.

22. The method of claim 15, wherein picking and placing the one or more articles comprises:
moving a handler in a first direction parallel to the first conveyance direction of the conveyed articles;
moving the handler in a second direction toward and away from a base point; and
moving the handler in a third direction perpendicular to the first and second directions by rotating the base point about an axis of rotation parallel to the first conveyance direction.

* * * * *